United States Patent [19]

Escudero

[11] Patent Number: 5,489,833
[45] Date of Patent: Feb. 6, 1996

[54] THREE-PHASE ELECTRONIC INVERTER FOR VARIABLE SPEED MOTOR

[75] Inventor: Jose Escudero, Mostolez, Spain

[73] Assignee: Antonio Merloni S.p.A., Fabriano, Italy

[21] Appl. No.: 251,697

[22] Filed: May 31, 1994

[30] Foreign Application Priority Data

May 31, 1993 [IT] Italy ................... BO93A0251

[51] Int. Cl.⁶ .................................................. H02P 7/00
[52] U.S. Cl. ........................................ 318/801; 318/808
[58] Field of Search .............................. 318/798–815; 363/34, 37, 40, 44, 50, 52, 54, 55, 57, 58, 96

[56] References Cited

U.S. PATENT DOCUMENTS

| | | | |
|---|---|---|---|
| 4,002,958 | 1/1977 | Akamatsu | 318/801 X |
| 4,161,680 | 7/1979 | Akamatsu | 318/801 X |
| 4,212,056 | 7/1980 | Kitamura et al. | 363/96 |
| 4,545,022 | 10/1985 | Walker | 363/37 |
| 4,666,020 | 5/1987 | Watanabe | 318/801 X |
| 4,843,296 | 6/1989 | Tanaka | 318/801 X |
| 5,184,057 | 2/1993 | Sakai et al. | 318/803 |
| 5,280,228 | 1/1994 | Kanouda et al. | 318/803 |

*Primary Examiner*—Jonathan Wysocki
*Attorney, Agent, or Firm*—Herbert Dubno

[57] ABSTRACT

A three-phase electronic inverter for an electric induction motor can operate the latter silently without the generation of magnetorestriction noise where the voltage of the rectifier outputted to the power transistor bridge is controlled by a TRIAC with regulation of the angle of conduction while the power transistor are pulsed in response to the output of a microprocessor through level adapters constituted by operational amplifiers.

5 Claims, 9 Drawing Sheets

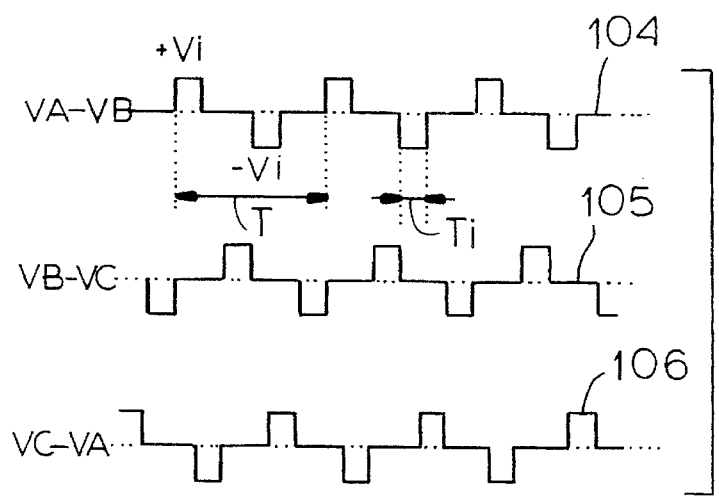
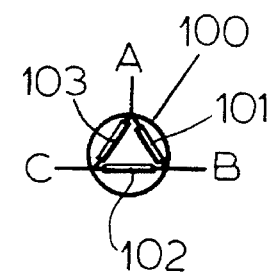
FIG.1A
FIG.1B
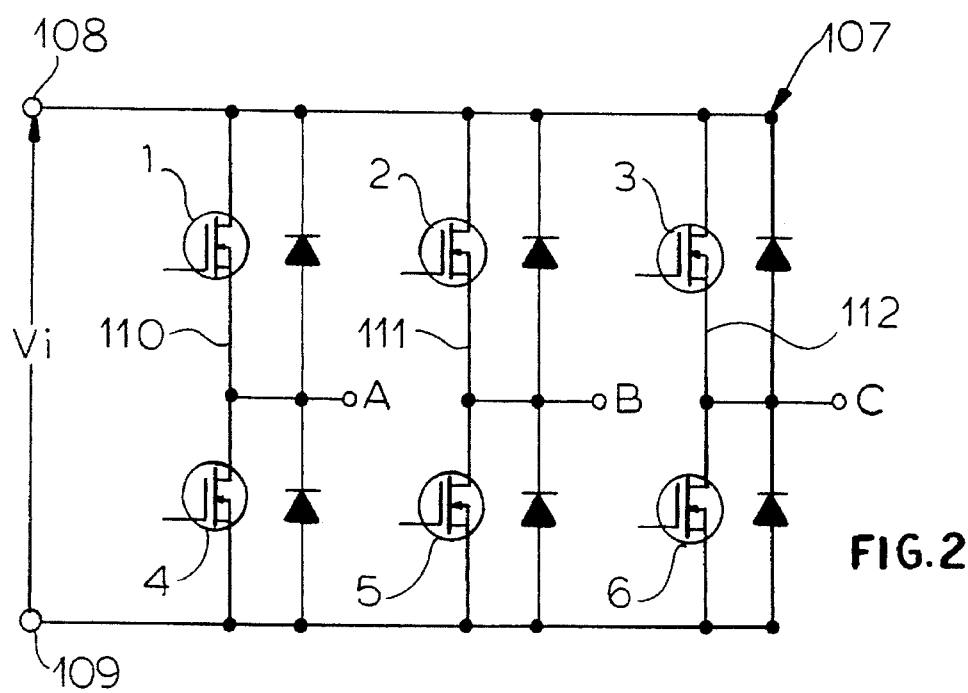
FIG.2

THREE-PHASE ELECTRONIC INVERTER FOR VARIABLE SPEED MOTOR

FIELD OF THE INVENTION

My present invention relates to a three-phase electronic inverter for variable speed operation of an electric motor.

BACKGROUND OF THE INVENTION

An electronic inverter basically comprises a switch circuit which is interposed between an alternating current network and an alternating current load and outputs a variable frequency alternating current to enable an electric motor, for example, to be driven at various speeds. A synchronous induction motors must be energized with varying frequency or a controlled frequency which establishes the speed thereof.

For this purpose electronic inverters can be provided to transform the constant-frequency network supply, usually at 50 Hz or 60 Hz to direct current and the resulting direct current to an alternating current by the triggering of power transistors.

In commercially available inverters on the market for the actuation of electric induction motors with variable frequency, the half-wave rectified signal constituting the output voltage to the power transistor bridge is modulated by a chopping technique, so-called "pulse width modulation". This has the drawback of producing noise in the motor. The noise is due to a magnetostrictive phenomenon in the motor resulting from the relatively high pilot frequency of the chopper. The device does provide for varying the output voltage of the inverter circuit with variation of the frequency as is required.

Another method to provide a frequency/voltage correlation is to use an inverter delivering a frequency which depends linearly on the supply voltage. If the voltage is doubled in such a circuit, the frequency is doubled.

Such inverters have relatively complex circuitry and often have problems in maintaining a constant voltage with increasing loads on the motor.

OBJECTS OF THE INVENTION

It is, therefore, the principal object of the present invention to provide an improved three-phase electric inverter for driving with variable speed a three-phase electronic induction motor whereby drawbacks of earlier systems can be avoided and, by particular, the noise generated by the electric motor in the inverter can be reduced and a practically silent operation obtained.

Another object of this invention is to provide an electronic inverter which avoids the need for a chopper affecting the inverter output of the type described and, in addition, which eliminates the need for complex inverter circuitry which might create problems with maintaining a constant voltage for varying loads.

SUMMARY OF THE INVENTION

These objects and others which will become apparent hereinafter are attained, in accordance with the invention, in an electronic inverter capable of operating a three-phase electronic induction motor which comprises:

a direct current source connected to an alternating current network and having a positive and a negative terminal;

a power transistor bridge provided with three arms, each of the arms having a pair of power transistors with series connected source-drain paths bridged between the positive terminal and the negative terminal of the direct current source;

respective diodes connected across the source-drain paths;

an output terminal tapped between the source-drain paths of each arm and connected to a respective winding terminal of a three-phase electric motor;

means for deriving a low direct voltage from the network;

control means receiving the low direct voltage for generating control pulses and applying the control pulses to gates of the power transistors in a cadence to produce across the windings square wave signals of alternating polarity and substantially 120° offset in phase from winding to winding; and means operable independently of the generation of the pulses, for controlling a voltage level outputted by the source to increase the voltage level substantially linearly with increase in the frequency of the cadence and a speed of the motor determined by frequency of the square wave signals.

The invention also encompasses a method of operating a three-phase electronic inverter driving a three-phase electric motor wherein a power transistor bridge is provided with three arms, each of the arms has a pair of power transistors with series connected source-drain paths bridged between a positive terminal and a negative terminal of a direct current source connected to an alternating current network, respective diodes are connected across the source-drain paths, and an output terminal between the source-drain paths of each arm is connected to a respective winding terminal of the three-phase electric motor, the method comprising the steps of:

(a) deriving a low direct voltage from the network;

(b) with the low direct voltage generating control pulses and applying the control pulses to gates of the power transistors in a cadence to produce across the windings square wave signals of alternating polarity and substantially 120° offset in phase from winding to winding; and (c) independently of the generation of the pulses, controlling a voltage level outputted by the source to increase the voltage level substantially linearly with increase in the frequency of the cadence and a speed of the motor determined by frequency of the square wave signals.

With the electronic inverter of the invention, waves are produced with a phase displacement of 120° with a pulse width Ti which is variable and a peak voltage Vi which is also variable, both acting or being selected in accordance with certain known conditions, namely, the pulse width Ti is less than or equal to three times the time constant of the field winding of the electric induction motor with an operating frequency of the cycle corresponding to a period T, the peak voltage Vi is equal to that applied to the motor windings, and the maximum amplitude is the maximum amplitude of a sinusoidal wave for the power and speed considered to be optimum for the motor and the load.

The electronic inverter according to the invention operates the motor without the magnetostrictive noise phenomenon which would be attributable to high frequency components in the voltage delivered to the motor. With the invention, the voltage is set by controllers for the timing angle for the firing of a TRIAC in circuit with a rectifier bridge connected across the power transistor bridge and which does not receive the high chopping frequency signals previously employed. The triggering pulses for the power transistor gates, i.e. the gates of the MOSFETS (metal oxide semiconductor field effect transistors) or IGBTS (insulated gate bipolar transistors), are thus not used to control the voltage outputted by the rectifier bridge and, conversely, there is a separation between the control of the voltage and the triggering of the power transistors.

The wave shape of the delivered voltage is approximately sinusoidal under all operating conditions of the motor with the result that the latter is operated with improved mechanical consistency.

The circuit arrangement utilizes commonly known analog and digital components and is therefore of limited cost.

Maintenance is simple and can be carried out by technicians with a comparatively low level of training.

Preferably the voltage level is controlled by triggering the TRIAC connected between the network and a rectifier bridge having the output terminals, a filter condenser being connected across the rectifier bridge, the method further comprising the step of varying a triggering angle of the TRIAC to regulate the voltage level.

The TRIAC can be triggered by activating a optoelectronic coupler connected in circuit with a gate of the TRIAC.

The power transistors are gated in a frequency of the control pulses by generating the control pulses with a microprocessor, applying the control pulses to respective operational amplifiers assigned to the said power transistors, and activating respective optoelectronic couplers in circuit with respective gates of the power transistors. The latter optoelectronic coupler can be controlled by at least one operational amplifier.

According to the invention, moreover, the lower voltage source can comprise:

a rectifier bridge connected to the network for rectifying network alternating current and producing a direct voltage across an output of the rectifier bridge;

at least one stabilizing resistance and Zener diode network connected to the output of the rectifier bridge for outputting voltages of +5 volts and $+V_{cc}$ capable of operating a microprocessor and gating the power transistors; and respective condensers for filtering the voltages outputted by the rectifier bridge.

The means for controlling the voltage applied across the power and bridge can include:

a TRIAC connected between the source and the network;

an optoelectronic coupler connected to a gate of the TRIAC for triggering same; and circuit means connected to the optoelectronic coupler for varying a triggering angle of the TRIAC to vary an output voltage of said source.

The source can include a rectifier bridge having the positive and negative terminals and a condenser across the source, a voltage across the condenser controlling the circuit means.

Preferably the control means includes a microprocessor generating wave shapes; and level adapters connecting the microprocessor to gates of the power transistors for bringing the power transistors into saturation/locking at a frequency determining the speed of the motor with the wave shapes.

The level adapters can include respective operational amplifiers and optoelectronic couplers connecting each gate of a respective power transistor with the microprocessor and activated by resistances so that saturation of a power transistor corresponds to a 0 logic state of a respective output of the microprocessor and locking of the respective power transistor corresponds to deactivation of the respective coupler and a 1 logic state of the microprocessor output.

BRIEF DESCRIPTION OF THE DRAWING

The above and other objects, features, and advantages will become more readily apparent from the following description, reference being made to the accompanying drawing in which:

FIG. 1(a) is a waveform diagram showing the wave shape of three voltages with a phase displacement of 120° applied to the terminals of the windings of motor and consisting of square wave pulses of alternating polarity.

FIG. 1(b) is a diagram of the motor showing the terminals at which the waveforms of FIG. 1(a) are applied;

FIG. 2 is an illustration of the three-phase bridge constituted by the power transistors and from which the voltage waveforms of FIG. 1(a) are obtained;

SPECIFIC DESCRIPTION

Figure 3A:
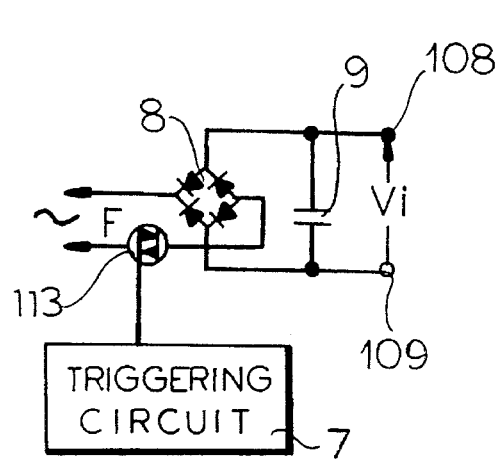
FIG. 3(a) is a circuit diagram illustrating the principles of a circuit providing a direct variable voltage and across which the bridge of FIG. 2 can be connected.

A motor 100 has windings 101, 102, 103 (FIG. 1b) with terminals A, B, C across which the voltage waveforms 104, 105, 106, (FIG. 1A) are applied in 120° phase shifted relationship with respect to one another. Each half cycle is constituted by a rectangular pulse with a duration Ti, less than or equal to T/2 where T is the period of the generated frequency. Each square wave half cycle has a voltage Vi. Vi is such that with the application of the waveforms of FIG. 1A to the windings of the motor of FIG. 1B, due to the time constant of these windings, a resulting current will flow which has a maximum intensity forming a sinusoidal wave which will cause the motor to perform at full power at the respective frequency.

To generate the waveforms of FIG. 1A, I utilize the power transistor bridge, namely a three phase bridge 107 as shown in FIG. 2, the bridge being connected to the positive and negative terminals 108, 109 of a direct current source connected in turn to the network. The bridge 107 has three bridge arms 110, 111, and 112 wherein the source-drain networks of pairs of power transistors 1, 2, 3, 4, 5, 6, respectively have outputs to the terminals A, B and C tapped between the power transistors. The gates of these power transistors, usually MOFETS or IGBTS, are triggered by pilot signals as will be described in greater detail below, but it will be understood that the power transistors are alternately saturated and blocked or locked in saturation/blocking cycles which give rise to voltages Va–Vb, Vb–Vc, Vc–Va for each cycle of period T as indicated in FIG. 1(a), the voltages being measured across the terminals A–B, B–C and C–A, respectively. If the bridge is supplied with a direct voltage Vi this will be the peak voltage of the individual half waves of each phase as the power transistors operate with complete saturation/locking.

The source of the voltage Vi can include a rectifier bridge 8 whose input side is connected to the alternating current network through a TRIAC 113, the gate of which is controlled by a triggering circuit 7. The alternating current waveform of the network is known at 114 in FIG. 3(b), the conductive periods in each cycle by the width of the trigger pulses 115, the output of the full wave rectifier bridge at 116 and the smoothed direct current at 117.

Figure 3B:
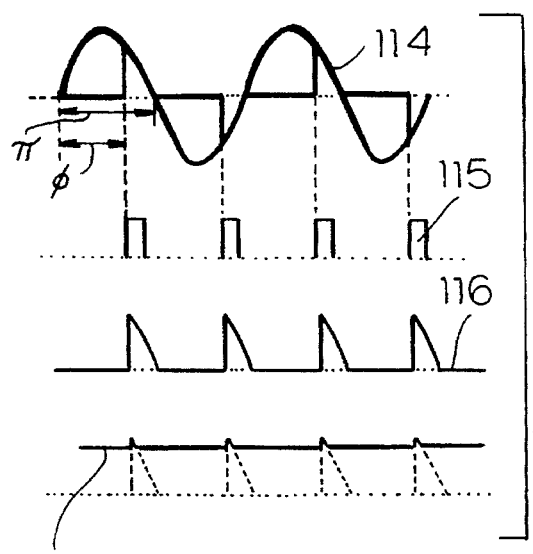
FIG. 3(b) is a diagram of the waveforms showing the input alternating current, the pulsed direct current output of the rectifier bridge and the filtered output delivered to the power transistor bridge.

If, in FIG. 3(a) the triggering circuit applies the pulses 115 to the gate of TRIAC 113 via the circuit 7 with a delay φ with respect to the alternating voltage supplied to the bridge 8, the TRIAC will be triggered allowing the passage and subsequent rectification of a fraction of the respective half cycle of the network voltage. Therefore at the output terminal of the bridge rectifier 8 there is a pulsed direct voltage with a peaked value Emax sin φ as shown in FIG. 3B. A filter condenser 9 connected across the rectifier bridge provides an output Emax sin φ with a slight waviness which will depend upon the capacitance of the condenser 9 and the internal resistance of the circuit supplying the network voltage.

With the control 7 varying the trigger angle φ of the TRIAC from 180° to 90° with respect to the input wave, the output direct voltage Vi is variable between 0 and Emax.

Figure 4:
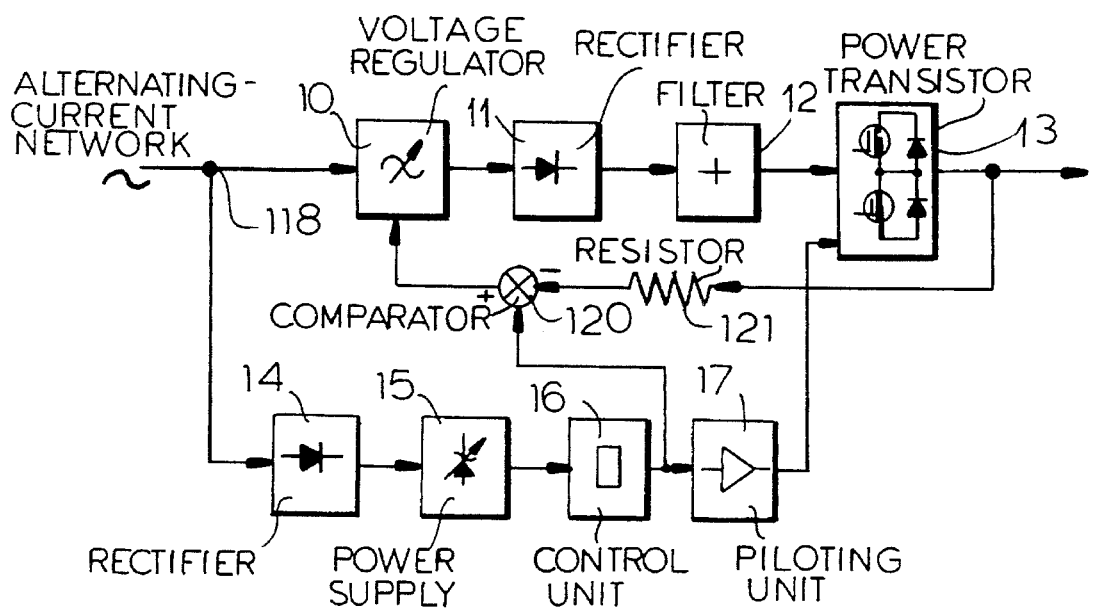
FIG. 4 is a block diagram of an inverter in accordance with the invention.
Figure 5:
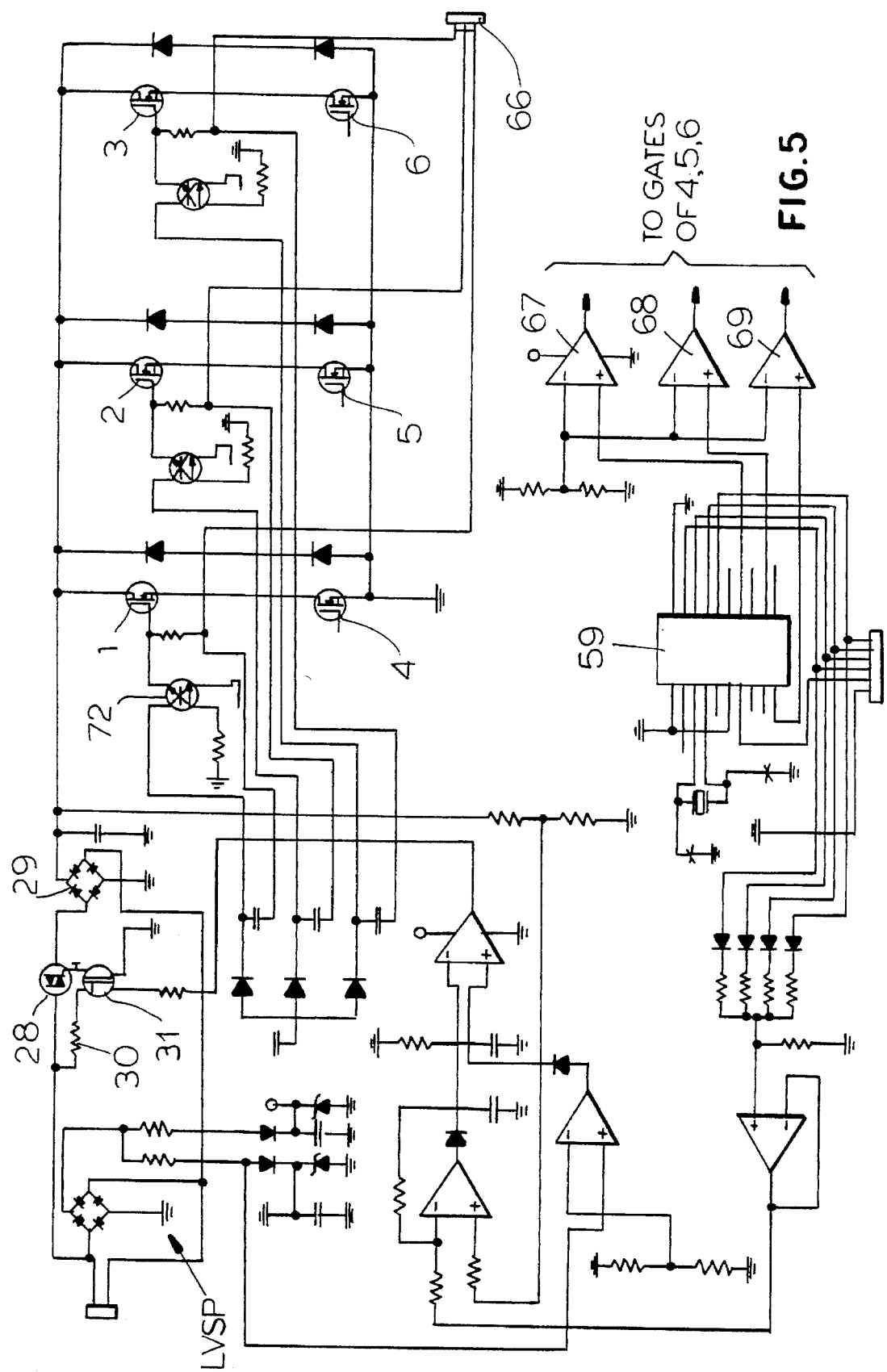
FIG. 5 is a circuit diagram of the inverter.
Figure 6:
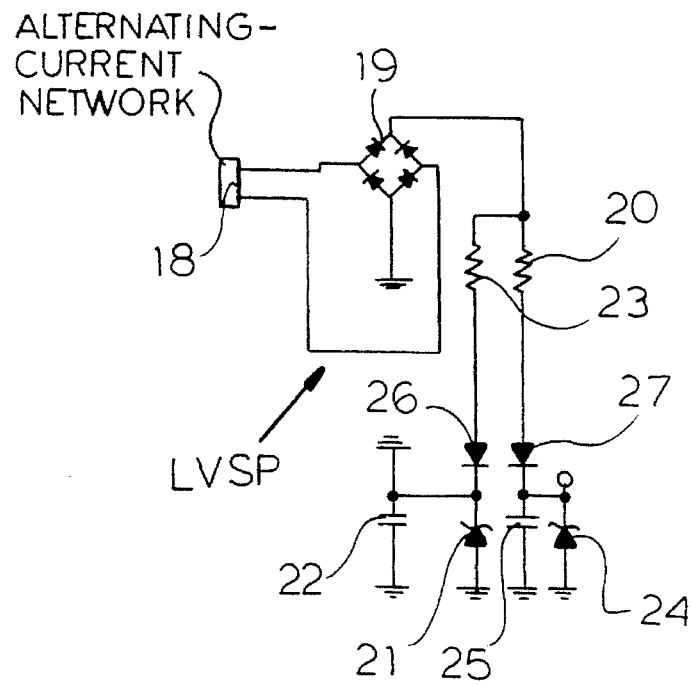
FIG. 6 is a circuit diagram detail of the components of the circuit of FIG. 5 which are involved in the low voltage supply.
Figure 11:
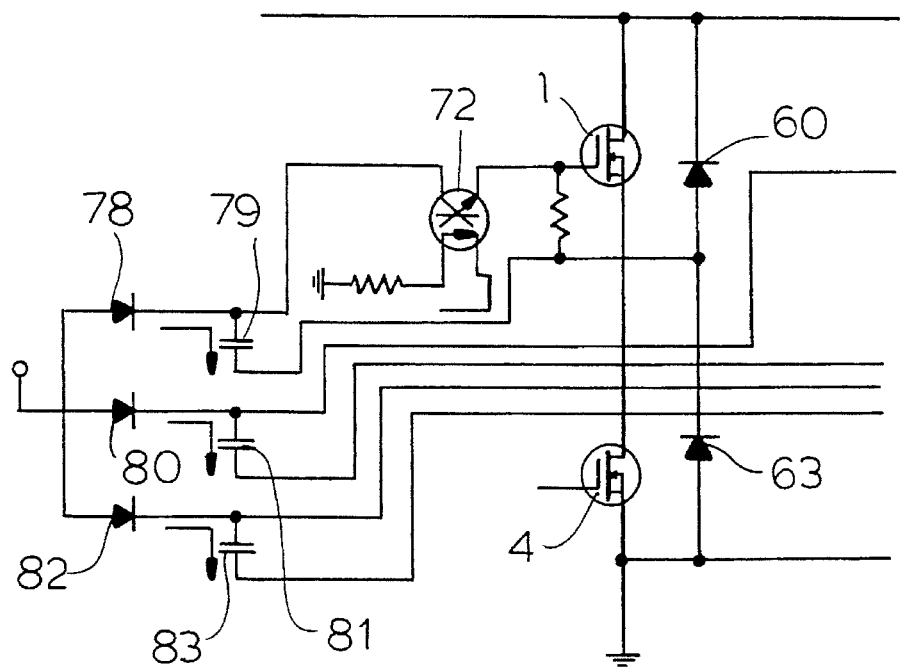
FIGS. 11 and 12 are details of the piloting circuits.

From FIG. 4 the block diagram of the inverter can be seen and FIG. 5 represents the system in circuit diagram form.

In FIG. 4 the network has been represented at 118 and supplies a voltage regulator 10 which feeds the rectifier 11 and the filter 12 downstream thereof. That provides the supply voltage for the three phase power transistor bridge 13. The power transistors of that bridge are, in turn, triggered by the piloting unit 17 with signals from the microprocessor control unit 16 to which a low voltage feed is provided by a power supply 15 downstream of another rectifier 14 connected to the network 118.

The voltage regulator 10 utilizes a TRIAC as has been described in principle in connection with FIG. 3(a) and regulates the magnitude of the voltage by varying the conduction angle of the TRIAC. The piloting voltage of the TRIAC, derived from the control unit 16 but independent of the piloting pulses, is applied to a comparator 120 where it is compared with the output voltage of the inverter or the rectifier 11 in a feedback loop containing a resistor 121. Any error signal adjusts the voltage regulator to compensate for any change in the voltage outputted by the inverter with the load.

The rectifier 11 is a full wave rectifier as has been described for regulating the alternating voltage delivered by the TRIAC of the voltage regulator unit 10. The filter 10 may be a condenser connected across the output of the rectifier.

The three-phase transistor bridge 13 has been described in connection with FIG. 2 and consists of power transistors which, by means of saturation/locking originating from the control unit, will generate alternating voltages at the inverter output with a peak value of the voltage across the condenser of the filter 12. The frequency and pulse duration, however, are determined by the pilot unit 17.

The rectifier 14 can be a full wave bridge with filter condensers and produces the direct current voltage for supplying the control unit through the block 15 which generates all levels of the direct voltage required for the control logic of the inverter, particularly for the microprocessor of the control unit and any other circuit requiring a low voltage level.

The control unit 16 itself is microprocessor based and generates the sequence of signal piloting the conduction/locking of the power transistors of unit 13 with the appropriate conduction times and sequences.

The piloting unit 17 adjusts the piloting signals generated by the control unit 16 from the logic level 0–5 volt to the level 0–Vcc required for piloting and saturation/locking of the transistors of unit 13.

Turning to the circuitry of FIG. 5 in greater detail, reference may be had as well to FIGS. 6–11 in which various circuit elements of FIG. 5 are shown in greater detail, the low voltage power supply (LVSP FIGS. 5 and 6) comprises an input at 18 from the alternating current network which is applied to the input terminals of a full wave rectifier bridge 19 across the output of which are connected resistors 20 and 23 in series with respective Zener diodes 21 and 24 for producing stabilized voltage outputs of +Vcc and + 5 volt as filtered by condensers 22 and 25 respectively; diodes 26 and 27 isolate the respective voltages.

Figure 7:
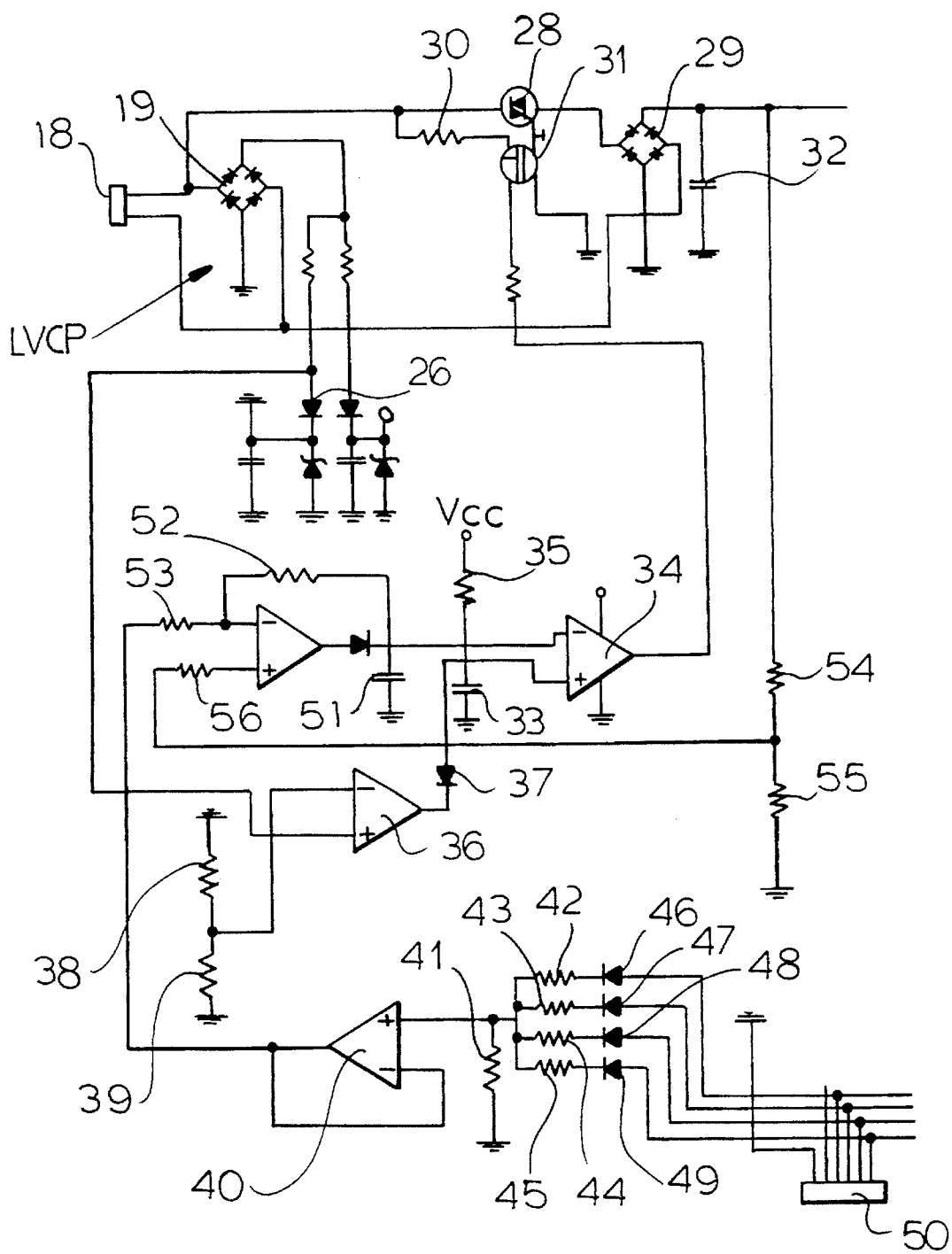
FIG. 7 is a detail circuit diagram of the components of the circuit of FIG. 5 which generate the voltage supplying the three-phase power transistor bridge.

The circuitry for generating the variable voltage Vi has been shown in greater detail in FIGS. 5 and 7 and comprises the TRIAC 28 which, in effect, corresponds to the TRIAC 113 previously discussed and is connected between the network connector 18 and the full wave rectifier by 29 which corresponds to the rectifier 8 previously described. The filter condenser for the rectifier bridge 29 is represented at 32. A phototriac 31 forms an optoelectronic coupler to the gate of the TRIAC 28 and is connected to a resistor 30. When the phototriac 31 becomes conductive, therefore, the TRIAC 28 receives current through the resistor 30 and the alternating current network is connected to the rectifier 29 to produce the variable direct voltage Vi across the condenser 32. The magnitude of the voltage Vi depends on the triggering angle φ of the TRIAC as has previously been described.

The variable direct voltage Vi is measured to the same voltage reference point of 0 volt as previously mentioned. A condenser 33 which is connected to the input of an operational inverting amplifier 34 controlling the phototriac 31 is charged with the voltage Vcc with a time constant equal to the capacitance of the condenser 33 times the resistance of a resistor 35. Normally the output of the operational amplifier 36 is at the level Vcc and is blocked to the condenser 33 by the diode 37. When the input of operational amplifier 36 connected to the anode of the diode 26 (FIG. 6) is lower than the input voltage of the amplifier connected to the divider formed by the resistors 38 and 39, the value of the voltage at the output of operational amplifier 36 becomes equal to 0 volt, discharging the condenser 33 through the diode 37. In this manner, at the (+) input of the operational amplifier 34 there is a slope synchronized with the passage of the network voltage through 0 as is apparent from the waveform 125 shown in FIG. 8.

The operational amplifier 40, connected as a voltage follower, reproduces the voltage of the divider and has the function of an adder adding inputs through the resistances 41 through 45 which are connected through respective diodes 46 through 49 to the terminals of a connector 50 receiving from the microprocessor digital signals corresponding to the frequency to be generated by the inverter.

In the condenser 51 connected to the (−) input of operational amplifier 34, a voltage is obtained with an amplification factor determined by the ratio of resistances 52/53 proportional to difference between the reference voltage (output of operational amplifier 40) and the output of the voltage divider constituted by the resistors 54 and 55.

Figure 8:
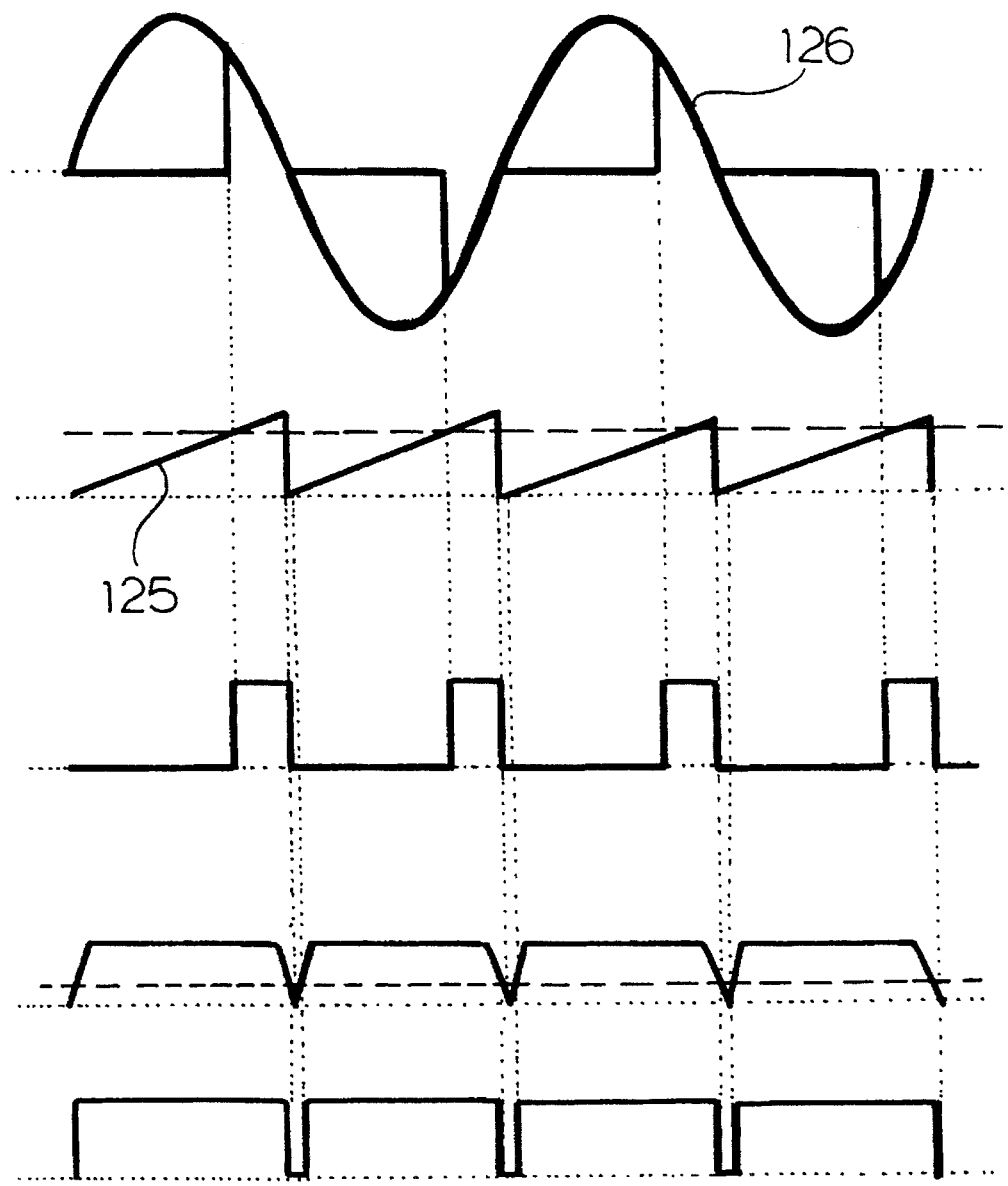
FIG. 8 is a diagram of the waveforms involved showing how at slope can be synchronized with the passage of the network through a zero value.

At the input (+) of the operational amplifier 34 the signal has a slope synchronized with the zero passage of the network voltage (waveform 126 in FIG. 8). When the voltage value of the slope is higher than the value at the (−) input which is proportional to the output voltage of the inverting operational amplifier, the output of the operational amplifier 34 jumps from 0 to Vcc, triggering the phototriac 31 and also the TRIAC 28.

The triggering angle φ of TRIAC 28 increases with the voltage increase across the condenser 32 and the voltage across the condenser 32 tends toward the reference value outputted by the operational amplifier 40.

Figure 9:
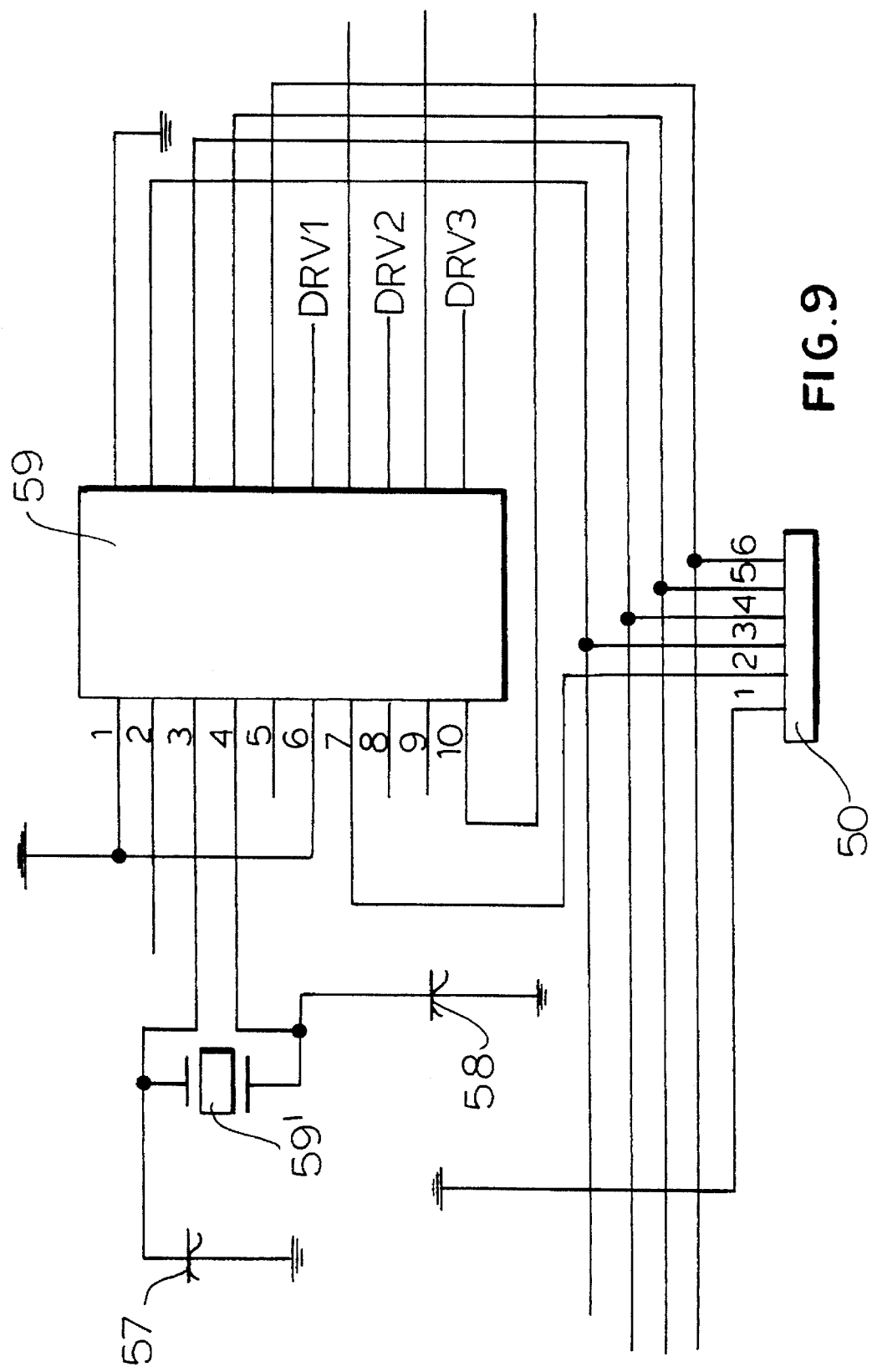
FIG. 9 is a detail of the circuit of FIG. 5 showing the portion controlling the triggering sequence for the power transistors.
Figure 10:
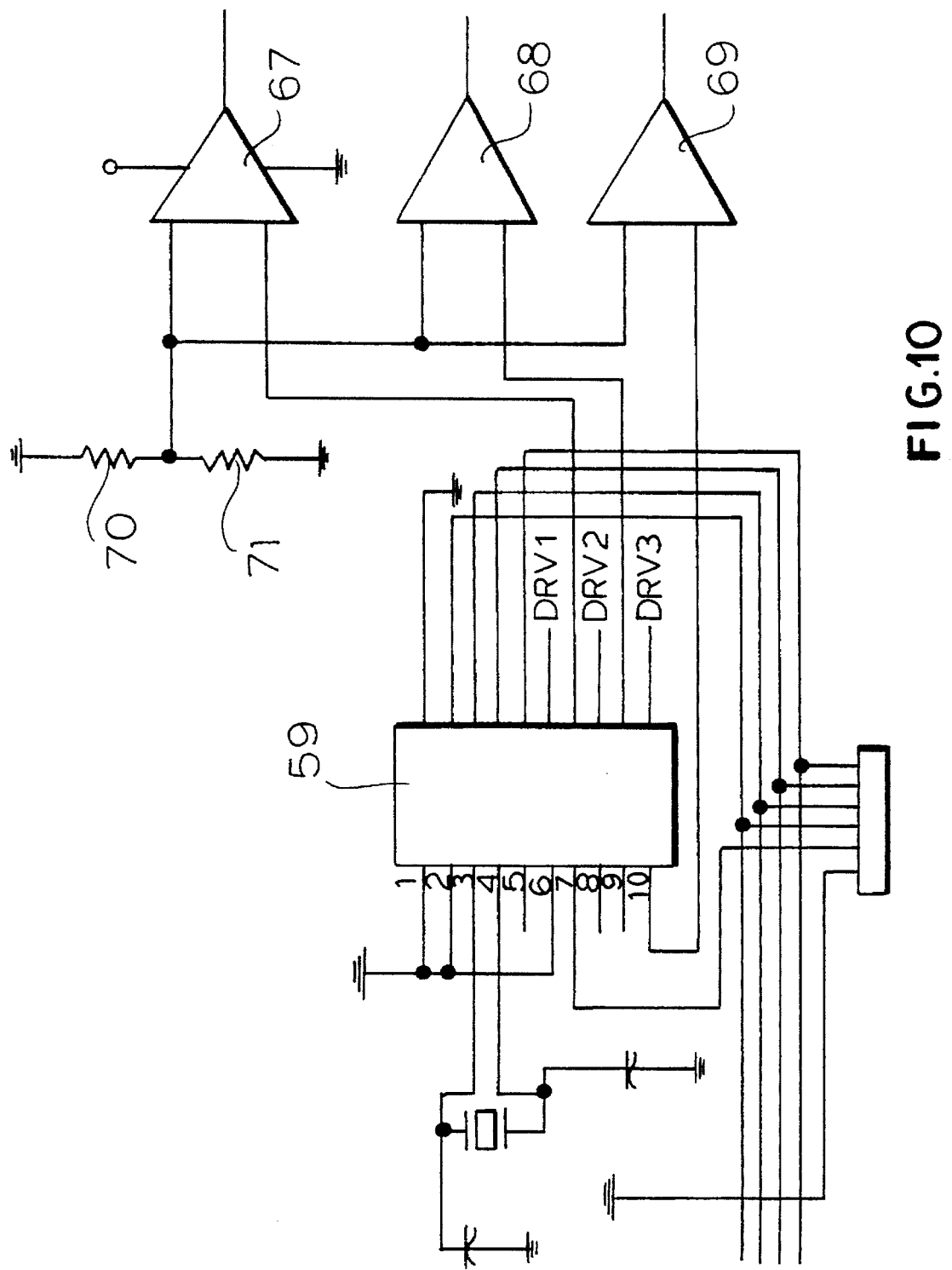
FIG. 10 is a circuit diagram of that portion of the circuit of FIG. 5 which contains the power transistors and the piloting circuits therefor.
Figure 12:
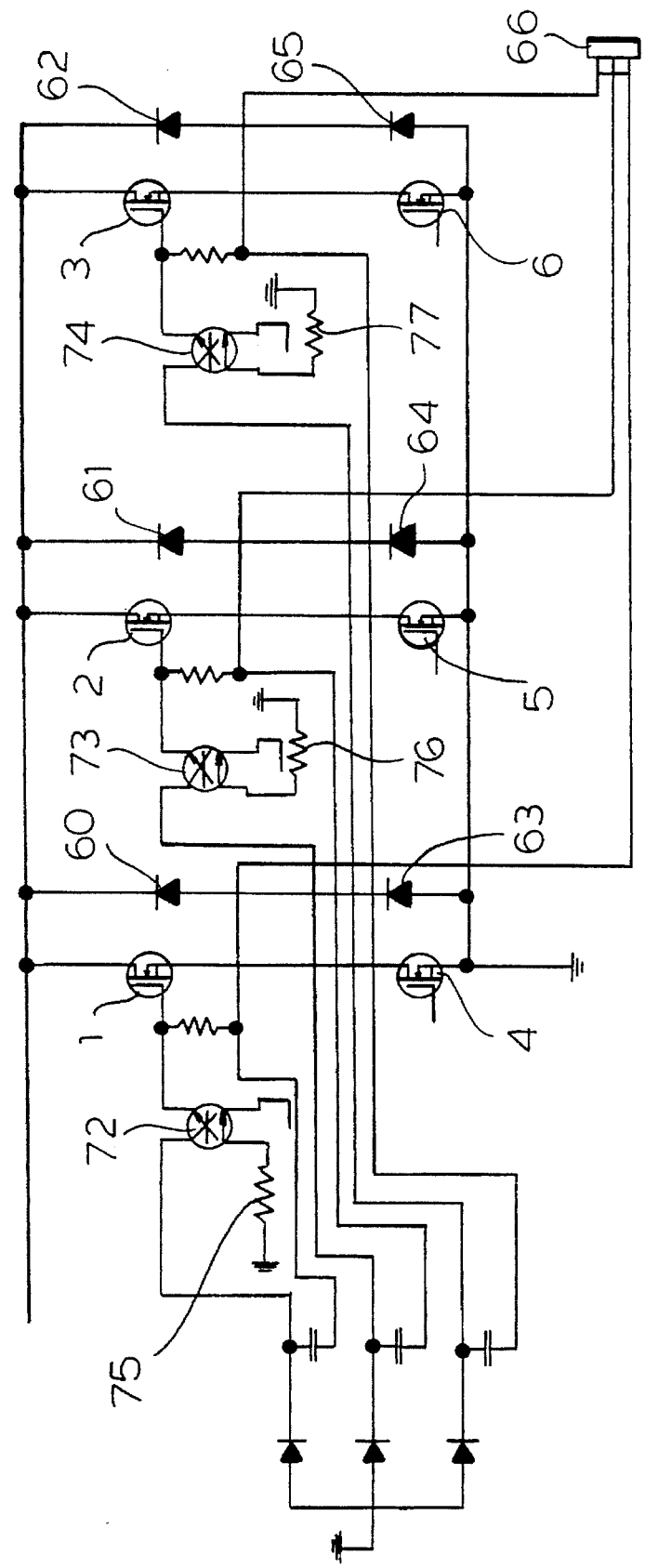

As can be seen from FIG. 9 (see also FIG. 5) the control unit comprises a microporcessor 59, circuitry enabling a quartz oscillator 59, usually internal, to generate the clock for the microprocessor and condensers 57 and 58. The microprocessor 59 generates the wave shapes which, by means of level adapters, brings the power transistors to saturation/locking. The microprocessor communicates with the outside through the connector 50 and through microswitches which are open or closed between the contact 1 of the connector and the contacts 2–6. The microprocessor switches the inverter to go/stop and selects the frequency to correspond to the speed selected for the motor. The piloting circuits for the power transistors are best seen in FIGS. 5, 10 and 11 and 12.

The power transistors 1 through 6 and their inverse diodes 60 through 65 serving for protection, from the typical structure of the tripbase bridge for the inverter which has been described in connection with FIG. 2.

The outputs of the bridge are tied to a connector 66 which forms the connection to the motor.

The pilot circuits of the power transistors 4, 5, 6 whose sources are at 0 volt level are created by connecting the gates with the outputs of the operational amplifiers 67, 68, 69. The outputs of these operational amplifiers are at 0 volt for the entire time period for which the inputs (+) thereof connected to the gate B (FIG. 9) of the microprocessor 59, PB1, PB2, PB3 are at 0 volt since the (−) inputs are connected to a voltage divider formed by resistors 70 and 71 which is higher than 0 and lower than 5 volt. Under these circumstances the power transistors are in a locking condition. When any of the gates B at the output of microprocessor 59, PB1, PB3 and PB5 pass into logic state 1 (+5 volt), the corresponding outputs of the operational amplifiers 67, 68 and 69 jump to Vcc saturating the respective power transistors.

The piloting of the power transistors 1, 2 and 3 whose sources are at the voltage level of the inverter output and which are floating, is achieved by bringing the reference of the voltage Vcc up from 0 volt to the level of the respective source by using optoelectronic couplers 72, 73, and 74 to achieve saturation.

The couplers 72, 73, 74 are activated by means of resistors 75, 76, 77 when the outputs of gate B of microprocessor 59, PB0, PB2 and PB4 are in the 0 volt logic state. Under these circumstances, the associated power transistors are in saturation. When these outputs assume the logic level 1 (+5 volt) the couplers 72, 73 and 74 are deactivated and the power transistors lock.

The diodes and capacitors 78, 79, 80, 81, 82, 83 bring the respective reference voltage Vcc to 0 volt at the level of the source of the transistors 1, 2 3. When the transistor 4 is in a state of saturation, the transistor 1 locks and the optoelectronic coupler 72 is inactive. Since the transistor 4 is in a state of saturation the drain is practically at 0 volt causing a current Ic1 to circulate for the diode condenser network 78, 79 charging the condenser 79 to the value Vcc. When the transistor 4 passes into the locking or nonconductive state, the condenser 79 is charged with a voltage value Vcc with reference to the source of transistor 1. When the photocoupler is activated, the positive pole of condenser 79 is connected with the gate of transistor 1 and a voltage Vcc is established between the gate and source of transistor 1.

The diode 78 blocks the charging of the condenser 79 in the reverse sense when the drain of transistor 4 is at the maximum voltage of the inverter output. The diode condenser 80, 81, and 82, 83 operate similarly for the transistors 2, 5 and 3, 6.

The currents Ic2 and Ic3 circulate when the transistors 5 and 6 are saturated and hence conductive.

I claim:

1. A three-phase electronic inverter for driving a three-phase electric motor, comprising:

a direct current source connected to an alternating current network and having a positive and a negative terminal, a first rectifier bridge provided with said positive and negative terminals, a first TRIAC in circuit with said network and said first rectifier bridge, and a first optical coupler connected to a gate of said first TRIAC for controlling a voltage across said positive and negative terminal;

a power transistor bridge provided with three arms, each of said arms having a pair of MOSFET or IGBT power transistors with series connected source-drain paths bridged between said positive terminal and said negative terminal of said direct current source;

respective diodes connected across said source-drain paths;

an output terminal tapped between the source-drain paths of each arm and connected to a respective winding terminal of a three-phase electric motor;

means including a second rectifier bridge for deriving a low direct voltage from said network;

control means receiving said low direct voltage and including a respective second TRIAC connected to a gate of one respective power transistor of each arm, and a respective second optical coupler connected to a gate of each second TRIAC for generating control pulses and applying said control pulses to gates of said power transistors in a cadence to produce across said windings square wave signals of alternating polarity and substantially 120° offset in phase from winding to winding; and means operable independently of the generation of said pulses, for triggering said first optical coupler and controlling a voltage level outputted by said source to increase said voltage level substantially linearly with increase in the frequency of said cadence and a speed of said motor determined by frequency of said square wave signals.

2. The three-phase electronic inverter defined in claim 1 wherein said means for deriving said low direct voltage comprises:

at least one stabilizing resistance and Zener diode network connected to said output of said second rectifier bridge for outputting voltages of +5 volts and $+V_{cc}$ capable of operating a microprocessor and gating said power transistors; and respective condensers for filtering the voltages outputted by said rectifier bridges.

3. The three-phase electronic inverter defined in claim 2 wherein said means operable independently of the generation of said pulses includes:

circuit means connected to said optical coupler for varying a triggering angle of said first TRIAC to vary an output voltage of said source.

4. The three-phase electronic inverter defined in claim 3 wherein said control means includes:

a microprocessor generating wave shapes; and level adapters connecting said microprocessor to gates of others of said power transistors for bringing said power transistors into saturation/locking at a frequency determining the speed of the motor with said wave shapes.

5. The three-phase electronic inverter defined in claim 4 wherein said level adapters include respective operational amplifiers controlled so that saturation of a power transistor corresponds to a 0 logic state of a respective output of the microprocessor and locking of the respective power transistor corresponds to deactivation of a respective coupler and a 1 logic state of the microprocessor output.

* * * * *